(12) United States Patent
Zarrabian et al.

(10) Patent No.: US 6,785,002 B2
(45) Date of Patent: Aug. 31, 2004

(54) VARIABLE FILTER-BASED OPTICAL SPECTROMETER

(75) Inventors: Sohrab Zarrabian, Santa Rosa, CA (US); Fred J. Van Milligen, Santa Rosa, CA (US); Kenneth P. Rosenberg, Windsor, CA (US); John D. Sonderman, Santa Rosa, CA (US)

(73) Assignee: Optical Coating Laboratory, Inc., Santa Rosa, CA (US)

( * ) Notice: Subject to any disclaimer, the term of this patent is extended or adjusted under 35 U.S.C. 154(b) by 78 days.

(21) Appl. No.: 09/810,828

(22) Filed: Mar. 16, 2001

(65) Prior Publication Data

US 2002/0131047 A1 Sep. 19, 2002

(51) Int. Cl.⁷ .................................................. G01B 9/02
(52) U.S. Cl. ...................................................... 356/454
(58) Field of Search .............................. 356/451, 454, 356/519, 458, 482; 359/618, 629, 634

(56) References Cited

U.S. PATENT DOCUMENTS

| | | | |
|---|---|---|---|
| 3,929,398 A | 12/1975 | Bates | 356/186 |
| 5,082,629 A | 1/1992 | Burgess, Jr. et al. | 422/82.11 |
| 5,144,498 A * | 9/1992 | Vincent | 359/885 |
| 5,166,755 A * | 11/1992 | Gat | 356/419 |
| 5,218,473 A | 6/1993 | Seddon et al. | 359/589 |
| 5,255,332 A | 10/1993 | Welch et al. | 385/17 |
| 5,303,165 A | 4/1994 | Ganz et al. | 364/571.01 |
| 5,343,542 A * | 8/1994 | Kash et al. | 356/454 |
| 5,392,117 A | 2/1995 | Belleville et al. | 356/352 |
| 5,583,683 A * | 12/1996 | Scobey | 398/79 |
| 5,719,989 A | 2/1998 | Cushing | 359/589 |
| 5,760,391 A * | 6/1998 | Narendran | 250/227.14 |
| 5,760,910 A | 6/1998 | Lepper, Jr. et al. | 356/416 |
| 5,850,292 A | 12/1998 | Braun | 356/419 |
| 5,872,655 A * | 2/1999 | Seddon et al. | 359/588 |
| 5,991,023 A | 11/1999 | Morawski et al. | 356/326 |
| 6,002,479 A | 12/1999 | Barwicz et al. | 356/326 |
| 6,057,925 A | 5/2000 | Anthon | 356/419 |
| 6,130,971 A * | 10/2000 | Cao | 385/31 |
| 6,151,114 A * | 11/2000 | Russell | 356/519 |
| 6,272,157 B1 * | 8/2001 | Broutin et al. | 372/32 |
| 6,278,549 B1 * | 8/2001 | Gaebe | 359/584 |
| 6,334,014 B1 * | 12/2001 | Nitta et al. | 385/39 |

FOREIGN PATENT DOCUMENTS

| | | | |
|---|---|---|---|
| EP | 0 442 738 A2 | 8/1991 | G02B/5/28 |
| WO | WO 95/20144 | 7/1995 | G01J/9/02 |

OTHER PUBLICATIONS

Takashashi, Haruo. "Temperature stability of thin–film narrow–bandpass filters produced by ion–assisted deposition."☐☐☐☐Applied Optics, vol. 34, No. 4, Feb. 1, 1995, pp. 667–675.*

Haruo Takashashi, *Temperature Stability of Thin–Film Narrow–Bandpass Filters Produced by Ion–Assisted Deposition*, Applied Optics, vol. 34, No. 4, 667–75 (Feb. 1, 1995).

* cited by examiner

*Primary Examiner*—Edward J. Glick
*Assistant Examiner*—Thomas R Artman

(57) ABSTRACT

An optical spectrometer uses a tapered Fabry-Perot type variable optical filter in conjunction with an optical detector array. The filter can be a long-pass, short-pass, or narrow bandpass filter. The stability of the variable optical filter allows high resolution, depending on the number and spacing of the detectors used. In a further embodiment, signal-processing techniques are used to enhance the resolution of the spectrometer beyond the measured response.

20 Claims, 3 Drawing Sheets

VARIABLE FILTER-BASED OPTICAL SPECTROMETER

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

The invention relates generally to optical spectrometers, and more specifically to an optical spectrometer using a variable etalon optical filter structure in conjunction with an optical detector array.

Optical telecommunications systems often carry several optical channels on a single optical fiber using a technique known as wavelength-division multiplexing ("WDM"). The channels generally carry data such as voice transmissions, pictures, and/or video as a digital signal, but analog signals might also be carried in some instances. Channels are often described according to their nominal center-channel wavelength. The spacing between channels has continued to decrease as demand for optical communications has grown. Decreasing channel spacing allows more channels to be sent over an existing optical fiber, thus increasing capacity without laying additional optical cable. In current dense WDM ("DWDM") systems, the channels may be spaced only 100 GHz (0.8 nm at 1550 nm) or 50 GHz apart (0.4 nm at 1550 nm), with even closer channel spacing being desirable.

As the demand for higher performance optical telecommunications systems grows, so does the need to characterize the components and systems. Performance of optical components, systems, and subsystems can be defined and measured in many ways, such as by signal strength, signal-to-noise ratio, and signal wavelength, including wavelength stability. The measurements might be made as an initial measurement when the component or system is first built, or monitoring of a system or signal path might be done on a continuous or periodic basis. Measuring the wavelength(s) of an optical signal is often done with an optical spectrometer.

Generally speaking, an optical spectrometer provides an indication of amplitude versus wavelength for an optical input. An optical signal analyzer, which often uses a movable grating or filter in association with an optical detector or detectors, provides a similar function. Many conventional optical spectrometers use dispersive elements, such as a diffraction grating or prism, to spread the optical signal into its constituent wavelengths with a detector array that has detectors positioned to measure the signal strength of the wavelength associated with that position. These techniques require a relatively large device to accommodate the rate of dispersion of the signal, and may be susceptible to shock and vibration moving the dispersive element with respect to the detectors. Such misalignment could result in measurement errors and require frequent calibration and/or alignment.

Another approach to optical spectroscopy utilizes a rotating variable bandpass filter in conjunction with a wide band detector. The rotating filter is placed between the detector and the light source. The light entering the detector from the light source depends on which portion of the filter has been rotated between the source and the detector. The filter is typically rotated with a stepper motor, thus achieving a fairly accurate and repeatable position that allows for calibration of the system. One technique uses a filter with relatively few layers and a relatively wide bandpass characteristic so that only about half of the incident light is transmitted through the filter at each position of the filter, thus the same wavelength light is detected at multiple filter positions. This improves the measured signal intensity, but resolution suffers. The resolution can be enhanced with a thorough characterization of the system and calibration, but this approach is generally suited more for lower resolution spectroscopy, such as chemical analysis and in-vivo blood testing, such as a blood glucose monitor, than for applications requiring high resolution of closely spaced optical signals. This approach also relies on the mechanical movement of the filter, which increases the complexity and opportunity for mechanical failure of the system.

Another approach avoids the need for a mechanically moving filter by combining a variable filter with a detector array. Each detector (pixel) in the detector array is exposed to a different portion of the spectrum according to its position relative to the variable filter. The filter could be a variable long-pass, short-pass, or band-pass filter. The spectral resolution may be adjusted, within limits, by selection of the filter's spectral spread and number and spacing of detectors. Each pixel in the detector array is covered by a different portion of the filter and thus exposed to a different spectral transmission through the filter. However, conventional spectrometers using this type of filter-detector have limited resolution due to limitations in detector and filter fabrication technology.

Thus, an optical spectrometer that is compact stable, robust, easy to assemble, and that offers high wavelength resolution is desirable. It is particularly desirable if the resolution allowed measurement of adjacent channels in a WDM system having a channel spacing of 200 GHz or less.

BRIEF SUMMARY OF THE INVENTION

The invention provides a variable filter-based optical spectrometer using a Fabry-Perot (etalon) structure having high thermal stability in combination with a detector array. Short-pass, long-pass, or narrow band-pass filters can be used. The stability of the thin-film reflectors and intervening spacer region allows enhanced wavelength resolution from characterization of the filter-detector assembly and reconstruction techniques.

The input signal is typically carried on an optical fiber and lenses are used to expand and deliver the essentially point source of light from a fiber end into an optical beam that illuminates the variable filter. Other types of optical waveguides or systems could be used instead of an optic fiber. The expanded beam is only about 5–12 mm across, thus allowing a relatively small optical detector array. A small detector array is particularly desirable when using potentially expensive compound semiconductors and/or when a small footprint or size is desired. In one embodiment, a linear InGaAs diode array having 256 elements is used. Generally, the dimensions of the filter and the beam size are matched to the detector array to provide the complete spectral range available from the filter, but the filter and detector array do not have to match the beam size, and do not have to be of the same size.

In a further embodiment, signal-processing techniques are used to enhance the wavelength resolution of an optical spectrometer system using a reconstruction method. The variable filter/detector array assembly is characterized by providing a series of input signals of known wavelength and spectral profile, such as a series of laser inputs at wavelength intervals of 0.5 angstroms for a variable filter/diode array assembly having a nominal (as-measured) resolution of 8 angstroms or less. The accumulated response is used to create a transfer function that is applied to a subsequently measured optical signal to enhance the resolution of the optical spectrometer system, in some instances by a factor of 5 or more.

DETAILED DESCRIPTION OF THE INVENTION

I. Introduction

An optical spectrometer utilizing a tapered or wedge-shaped Fabry-Perot type filter structure provides high wavelength resolution, compact size, and reduced cost. The filter-detector assembly is relatively easy to fabricate because of the low component count and limited necessary optical alignment. The technique allows use of a relatively small, integrated detector array. Photolithographic techniques, rather than hybrid circuit assembly techniques, provide a well-characterized linear detector array that consumes relatively little area on a fabrication wafer and results in a compact, rugged spectrometer component.

II. A Variable Optical Filter and Detector

Figure 1A:
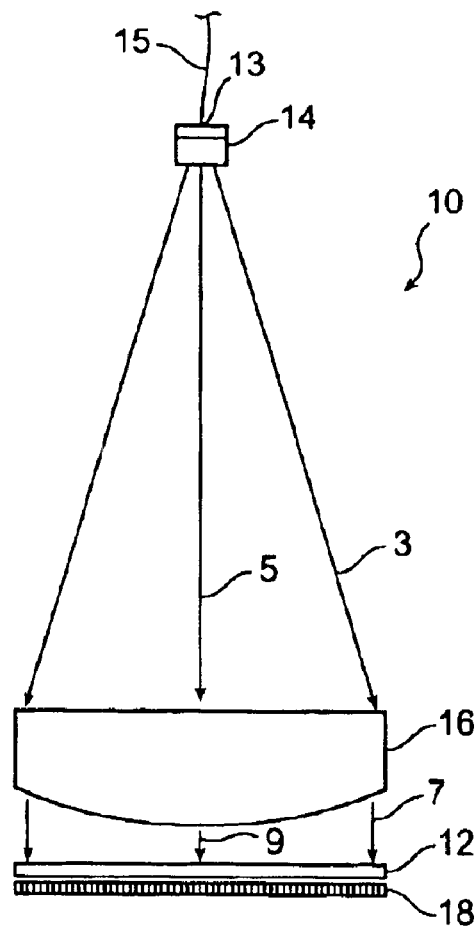
FIG. 1A is a simplified cross section of an optical spectrometer component according to an embodiment of the present invention.

FIG. 1A is a simplified cross section of an optical spectrometer component 10 according to an embodiment of the present invention. A variable filter 12 is assembled with collimating optics 14, 16 and a photo-detector array 18. The collimating optics may include color correction. The collimating optics include a magnifying lens 14 that magnifies the essentially point source of light from the end 13 of the optic fiber 15, the arrows 3, 5 representing the light, and a collimating lens 16, that provides a light beam 7, 9, to the filter 12. In a typical system, both the magnifying and collimating lenses are cylindrical lenses. The optic fiber has a core diameter of about 40 microns, which is expanded to a collimated beam about 10 mm across. Thus, the filter is about 10 mm along the direction of the taper, and the detector array is about 10 mm long.

Figure 1B:
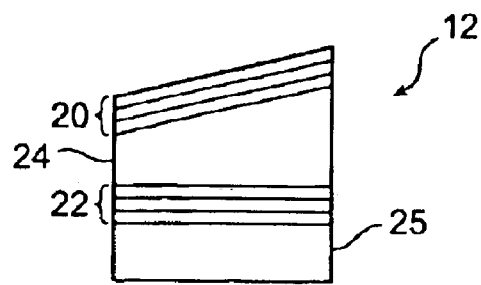
FIG. 1B is a simplified cross section of an etalon structure with a tapered spacer region for use with spectrometers according to embodiments of the present invention.

FIG. 1B is a simplified cross section of one embodiment of the variable filter 12. An etalon structure having a first reflector 20, a second reflector 22 and a spacer section (cavity) 24 is formed. In other embodiments a multiple cavity filter may be used. The spacer section is tapered, or wedge-shaped. Each reflector is generally a stack of dielectric thin films of materials of alternating materials having relatively higher and lower indices of refraction, as is well known in the art. The structure is often deposited on a substrate 25 of optical glass, but could be directly deposited on the focusing optics, for example. The spacer section operates in conjunction with the reflectors to form a wavelength-selective structure, i.e. filter, that efficiently transmits or reflects light.

The wavelengths of interest for utilizing the variable filter-based optical spectrometer generally include 1530–1600 nm because those wavelengths are conveniently amplified with erbium-doped fiber amplifiers and thus prevalent in optical telecommunication systems. Other wavelengths may be of particular interest in other optical systems, and the present invention may be applied to those wavelengths as well.

As an example, using 1550 nm as a nominal center frequency, the silicon dioxide spacer region 24 varies from about 1090 nm thick to about 1120 nm thick over a run d of about 12 mm, which produces a spectral range of about 1530–1570 nm. The detector array 18 is a linear array of 256 elements on nominally 50 microns center-to-center spacing with an 80% fill factor, thus the array is about 12 mm long. The detectors are InGaAs detectors, but could be made of other materials, such as InP. In other optical systems other types of detectors might be more desirable. InGaAs is a relatively expensive compound semiconductor, hence it is particularly desirable to be able to use a detector array with a small area. With a linear array of 256 detectors essentially evenly spaced along the run of the array, each detector responds to a spectral range of about 0.13 nm.

The reflectors 20, 22 can be fabricated from several well-known materials such as $TiO_2$, $Ta_2O_5$, or $Nb_2O_5$ for the high-index material and silicon dioxide, $MgF_2$, or $CeF3$ for the low-index material. In a particular embodiment, both reflectors are dielectric stacks of $Ta_2O_5$ alternating with $SiO_2$. Additional coatings, such as anti-reflective coatings, can be added if desired for some embodiments. Unlike other variable filters that taper several layers to achieve a variable filter, the etalon structure of the present invention allows depositing uniform reflector layers and tapering only the spacer region. In alternative embodiments of the present invention, additional layers (i.e. layers in the reflector stack (s)) may be tapered. In further embodiments, the etalon structure includes additional spacer layers. In yet another embodiment, niobia ($Nb_2O_5$) is used for the high-index material instead of $Ta_2O_5$.

The spacer material is $SiO_2$, but could be any of several materials of either high or low index of refraction. The desired taper is achieved by shadow masking of the substrate, but could be made by other suitable methods. In one embodiment the filter is a narrow bandpass filter with a 50% bandwidth of about 0.6 nm about a nominal center frequency, which varies according to the position along the filter run.

The resolution of the spectrometer generally depends on the spacing of the detectors and discrimination of the filter, while the range depends on the spectral range of the filter that is focused onto the detectors. A large filter structure could be used with a relatively smaller detector array or vice versa, but this is generally undesirable because it would not fully utilize the components. Filter sensitivity, or slope, may be altered according to the desired performance of the structure or the size of the detector. For example, given a fixed diode array length and a matching filter run, decreasing filter sensitivity (providing a shallower spacer wedge) would improve resolution, but reduce the spectral range. This could be achieved by rotating the filter with respect to the linear diode array so that there would be less variation in the thickness of the spacer region along the run of the filter. Similarly, a filter that was larger than the diode array could produce spectrometers covering a different portion of the spectrum by aligning the detector towards the thin or thick end of the filter.

In some applications, such as Raman spectroscopy or in dense DWDM networks, the filter-detector may be optimized for high resolution over a narrow spectral range. In other applications, the range may be increased at the expense of resolution. If both high resolution and wide range are desired, a series of filter-detector arrays could be cascaded, as provided by the efficient reflection of out-of-band signals of the etalon structure.

Figure 1C:
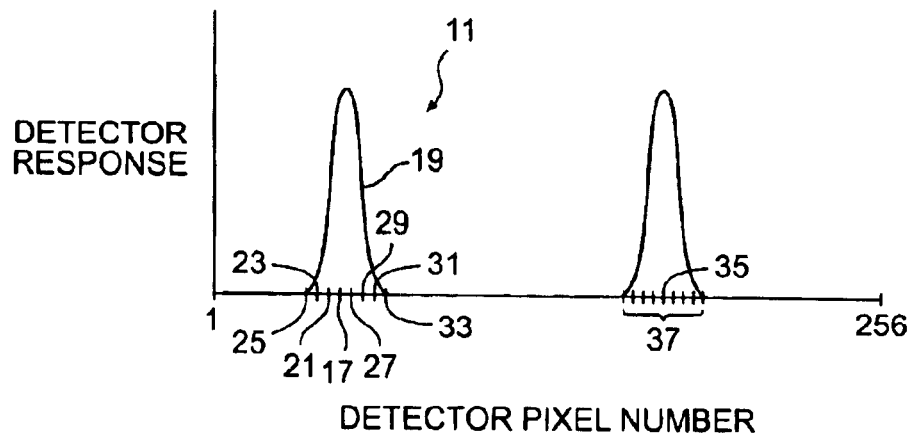
FIG. 1C is a simplified chart of detector response versus detector pixel number.

FIG. 1C is a simplified diagram illustrating the spectral response 11 of the optical spectrometer component illustrated in FIG. 1A for a first and second wavelength. An optical signal at a first wavelength illuminates the variable filter structure. A first location along the filter corresponds to a detector pixel number 17 underlying the portion of the filter with minimum insertion loss at that wavelength. The filter has a nominal center frequency and a passband shape generally as represented by the narrow bell-shaped line 19, assuming all detectors in the array are perfectly flat (versus wavelength) across the optical band of interest, and each detector provides the same output for a given detected optical signal. Actual pixels will vary in their wavelength response and amplitude response, and this variation, while appearing to be disadvantageous for accurate spectral measurements, can actually be used to enhance the accuracy of a spectrometer according to an embodiment of the present invention.

Even if the input optical signal is a single wavelength the filter shape allows a number of pixels 21, 23, 25, 27, 29, 31, 33 to be illuminated, and each pixel would provide a response, depending on the transmission of the portion of the LVF filter corresponding to the pixel location and detector characteristics. While the illustrated pixels 21–33 are adjacent to each other, other pixels might be illuminated as well. For example, the filter might have an out-of-band lobe that allows at least some illumination of other pixels.

The detector response would be generally represented by the intersections of lines parallel to the "y" axis intersecting the pixel number and the filter shape curve 19. The idealized filter shape curve is shown as being a continuous curve for purposes of illustration. In operation, each detector would provide a particular response, i.e. a point on the plot. Nine pixels are shown for ease of illustration, more or fewer pixels might be illuminated in an actual spectrometer component, depending on the detector pitch and filter characteristics. Even if the detector response of a pixel far away from the center pixel 17 is near the dark response (noise level), this information can be used in a calibration array to enhance the accuracy of the spectrometer.

A second location 35 along the detector array corresponds to a different nominal center wavelength. At this wavelength, the filter may have a slightly different, but generally the same, passband shape. The optical signal within this passband is transmitted to the underlying detectors 37, which measure the optical signal transmitted through the filter at the location corresponding to the overlying portion of the LVF when illuminated at the nominal wavelength.

The amplitude and response of the filter-detector assembly is calibrated for both amplitude and wavelength prior to use. The stability of the filter typically requires only a single calibration, as opposed to conventional diffraction-based optical spectrometers. Diffraction-based optical spectrometers, which generally use a diffraction grating or similar diffractive optical element, typically require frequent calibration and/or temperature control to maintain wavelength accuracy.

In a particular embodiment, a filter-detector spectrometer component according to the present invention has a filter with a thermal stability of less than 4 pico-meters/° C. In some embodiments, an active feedback system is used to provide thermal compensation. In other embodiments, thermal stability is achieved by appropriately selecting the substrate material that the filter layers are formed on. Such techniques are generally described in the paper by Haruo Takashashi entitled "Temperature Stability of Thin-Film Narrow-Bandpass Filters Produced by Ion-Assisted Deposition, *Applied Optics*, Vol. 34, No. 4, pp. 667–75 (February 1995). In yet other embodiments, temperature stabilization methods are used to at least partially de-couple the device temperature from ambient temperature to achieve an effective thermal stability of less than 4 pico-meters/° C. (3.7 pico-meters/° C. measured) over the intended operating range of the device (up to 70° C.). Optical filters with thermal stabilities of about 1–3 ppm/° C. or 0.001 nm/° C. are available from a number of manufactures, such as PRECISION OPTICS CORPORATION of Gayner, Mass. and OPTCOM of San Jose, Calif., respectively.

III. Spectrometer Calibration

While spectrometers according to the present invention described above are suitable for a number of applications, the wavelength resolution can be further enhanced with appropriate calibration according to a transform function technique. In fact, the spectrometer based on a narrow band LVF is particularly well suited for these reconstruction techniques for three vital reasons: 1) The coatings are very stable over time and temperature. 2) There are no moving parts that might result in misalignments over time. 3) The LVF is truly continuous in its linear variability at a microscopic level. This allows all of the information to be presented to the arrays without the need of any data stiching techniques applied to boundaries between coatings.

A spectrometer according to one embodiment of the present invention has an as-measured, or "nominal", wavelength resolution of about 8 Angstroms. A spectrometer according to another embodiment of the present invention has a nominal resolution of about 3 Angstroms. Laser inputs are provided to the spectrometer at 0.5 Angstrom intervals, i.e. at intervals less than the as-measured resolution. A calibration matrix is established for each detector at each calibration wavelength. For example, for a 256 detector array and a filter range of 40.0 nm, with calibration signals provided every 0.5 Angstrom, a 256×800 calibration array would be created. Another 256×1 calibration array is also typically created to provide the dark response, or electronic noise, output of the detector array. Typically, the noise calibration array is subtracted from each corresponding entry in the wavelength calibration array. The resulting array is called the transfer matrix. In some instances, it would not be necessary to store all detector outputs for each calibration wavelength. For example, with a narrow bandpass filter, detectors that are sufficiently far from the center-band detector might have output that is indistinguishable from the dark response, and thus not contribute to the transfer function. This consideration might also apply to devices with variable band-edge filters. However, always measuring the outputs from all detectors is easy, doesn't significantly complicate the calibration procedure, and simplifies the reconstruction of the input signal.

IV. An Exemplary Optical Spectrometer System

Figure 2:
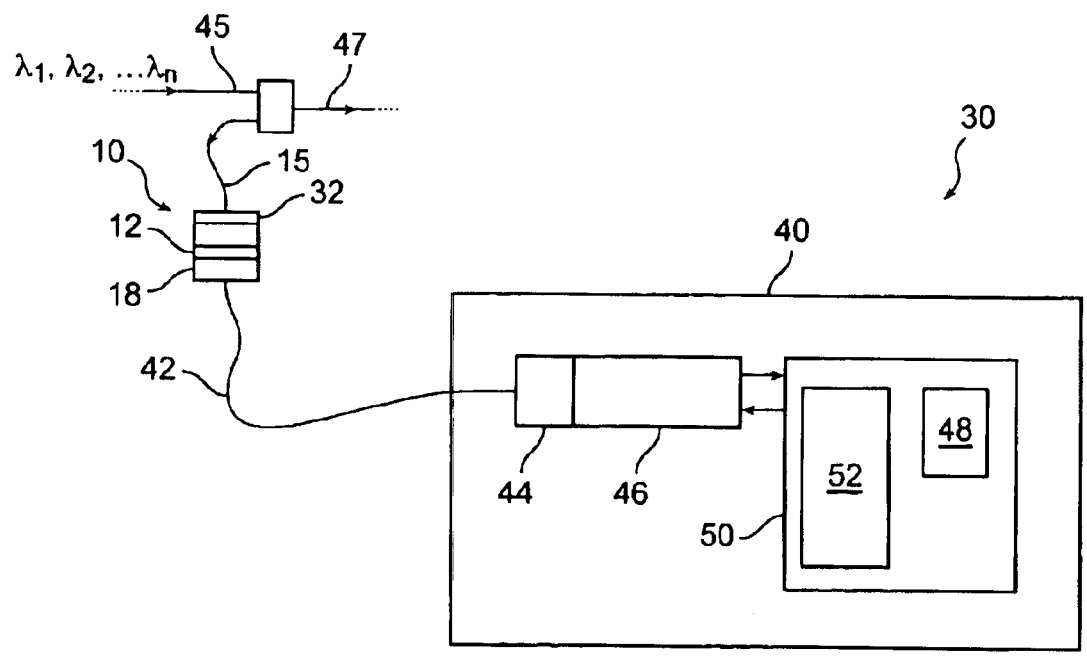
FIG. 2 is a simplified diagram of an optical spectrometer in an optical network according to an embodiment of the present invention.

FIG. 2 is a simplified diagram of an optical spectrometer system 30 according to an embodiment of the present invention used in an exemplary application. An optical spectrometer component 10 is illuminated with light from an input optic fiber 15 held in a ferrule. The optic fiber provides an essentially point source of light about 40 microns across, which is magnified with a first cylindrical lens and then collimated with a second cylindrical lens, as described above in conjunction with FIG. 1A. Other optics may be used, such as ball lenses, tapered fiber lenses, or reflective telescope systems. Alternatively, a single lens element can be used. Cylindrical lenses are convenient to align with the ferrules typically used with optic fibers, each of which is readily available from numerous suppliers.

The input optic fiber 15 receives the optical signal from a partial mirror 43, optical splitter, or similar device that taps a portion of the optical transmission signals $\lambda_1, \lambda_2, \ldots, \lambda_n$ carried on an optical fiber transmission line 45. After routing the tap signal to the spectrometer, the optical transmission signals proceed on the outgoing optical fiber transmission line 47.

Light within the spectral range of the linearly variable filter ("LVF") passes through the filter 12 to illuminate the detector array 18. The detectors produce an electric signal indicative of the intensity of the incident light admitted to the detector by the filter. The electric signals are provided to an analyzer 40 over a cable 42. The electric signals from the detectors are initially analog, and are converted to digital signals with an A/D converter 44. Alternatively, the A/D converter could be integrated with the detector array as a hybrid or other integrated circuit. Additional circuitry could also be integrated with the spectrometer component, such as a circuit for measuring detectors in the array (multiplexing) and providing the measured values over the cable in succession. Various techniques are known and used in detector array technology, particularly in the area of digital imaging systems.

Providing the detector multiplexing function at the spectrometer component allows the use of a well-shielded, low-noise cable between the spectrometer component and the analyzer, if analog signals are sent from the spectrometer component. Digitizing the measured values at the spectrometer component can similarly provide a high degree of noise immunity. Such noise immunity is especially desirable when detecting a small signal, or when determining the difference between two relatively equal signals is desired.

The analyzer has a processor 46 that controls operation of the system according to a computer-readable program 48 stored in memory 50. The processor is preferably a specialized digital signal processor, but could be an appropriately programmed generic digital signal processor or conventional micro-processor. The memory could include a magnetic disk, such as a hard disk or a floppy disk, read-only memory ("ROM"), non-volatile read-write memory, optical disk, and other sorts of computer memory and combinations of memory types. Calibration data 52 is also stored in memory, typically as a programmable ROM that is programmed at the factory to correspond to the filter/detector assembly 10.

The calibration data is typically a matrix, or multi-dimensional array, of values representing the measured output of each detector at several calibration wavelengths of a signal of known amplitude. The number of calibration wavelengths is greater than the number of detectors, and in a preferred embodiment is at least 3 times greater than the number of detectors. This allows construction of a transfer function of the spectrometer from a known input having greater resolution than the nominal detector resolution. Such techniques are described in U.S. Pat. No. 5,303,165 entitled STANDARDIZING AND CALIBRATING A SPECTROMETRIC INSTRUMENT by Ganz et al., U.S. Pat. No. 5,991,023 entitled METHOD OF INTERPRETING SPECTROMETRIC DATA by Morawski et al., and U.S. Pat. No. 6,002,479 entitled APPARATUS AND MEASUREMENT FOR LIGHT SPECTRUM MEASUREMENT by Barwicz et al., all of which are hereby incorporated by reference for all purposes.

Generally, those patents disclose that a diffraction grating is used to disperse light and form an image of the spectrum. It was previously believed by the inventors that these techniques could not be easily adapted to be used with a variable filter-based system, certainty not to achieve resolution better than 8 Angstroms, because thermal and aging drift of the filter would invalidate the calibration data, requiring frequent re-calibration in order to achieve the desired resolution. Unlike simple diffraction spectrometer calibration that can be done with relatively few input signals, a calibration for enhancing resolution according to the present invention uses many closely spaced signals of known amplitude, which is very difficult to do in the field, particularly if the spectrometer is in use monitoring a channel on an optical communication network.

It was only after realizing that a suitably stable filter that is truly continuous could be fabricated that the inventors attempted to build an optical spectrometer according to the present invention. Variable filters have been built that are stable over both temperature and time, exhibiting a thermal drift of less than 50 ppm/° C. and an aging drift of less than 10 ppm/year. In another embodiment, variable filters according to the present invention have a thermal drift of less than 25 ppm/° C., and in yet another embodiment, variable filters according to the present invention have a thermal drift of less than 10 ppm/° C. One particular filter was measured with a thermal stability of about 2 ppm/° C.; however, measurement uncertainty could have been a significant factor in the measurement of such a low value.

This stability allows practical devices to be calibrated, typically at the factory, and used for a reasonable period of time in the field. Of course, the devices could be re-calibrated if necessary, and, provided the proper calibration system was available, could even be calibrated or re-calibrated in the field. The calibration data can be used in a reconstruction transfer function, or, if the nominal resolution of the spectrometer is sufficient for the intended application, such as if the optical spectrometer has a nominal resolution of less than 8 Angstroms or of about 3 Angstroms or less, to correct the as-measured data without reconstruction in a direct measurement. Furthermore, it was believed that a variable bandpass filter was necessary to build an optical spectrometer according to the present invention, but the inventors realized that a variable edge filter (i.e. variable long-pass or short-pass) could be used as well.

When evaluating a variable edge filter, the inventors realized that, for a given input spectrum, successive optical detectors in the diode array could have relatively high outputs for a given input signal compared to a similar arrangement with a narrow bandpass filter. For example, if the input spectrum is composed of two wavelengths, each exactly centered at a wavelength corresponding to a detector with the LVF having a perfect (square-top) bandpass filter shape, each underlying detector will have a relatively high output while the adjoining detectors will have a relatively low output. Now consider the case where the band edge is "below" both wavelengths. Detectors above that band edge but below the nearest wavelength (i.e. locations along the run of the filter) will essentially detect both wavelengths and provide about the same output signal, with minor variations due to the spectral response of the generally broad-band detectors. As one moves along the run of the filter toward the further wavelength, first one wavelength and then the other will "drop out" of the detected spectrum. Although the implementation of variable edge filters do allow seemingly simpler reconstruction algorithms, it suffers serious drawbacks in performance. Reconstruction of the variable edge filter requires repeated subtractions of two large numbers to attain a resulting small number. This approach is very susceptible to errors when any optical or electrical noise is present in the system and also suffers from the fact that it does not truly use the full dynamic range available in the detector array. Therefore, for high performance systems that benefit from both high wavelength and intensity accuracy, it is preferred to use variable narrow-band filters.

V. Exemplary Methods

Figure 3A:
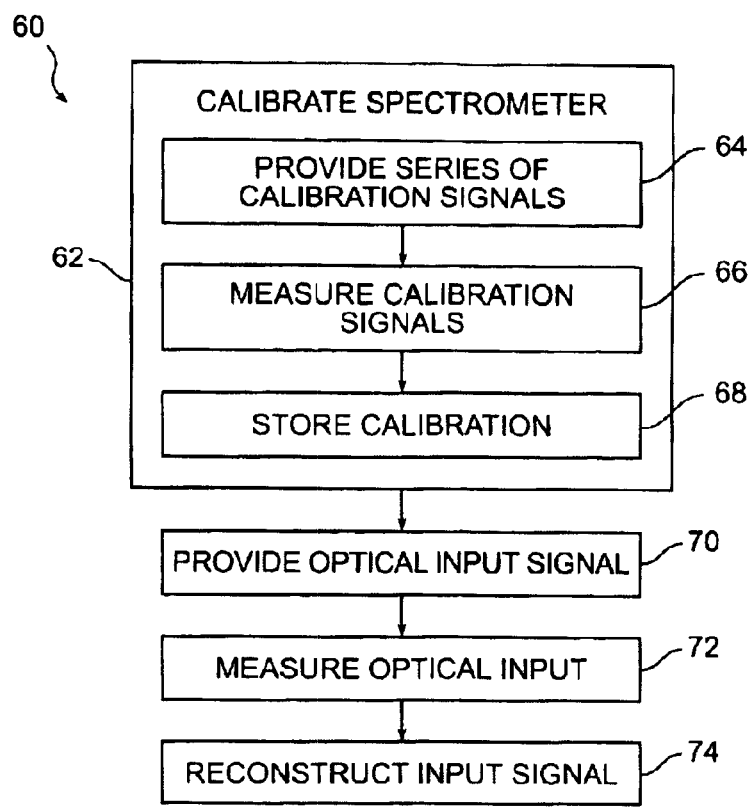
FIG. 3A is a simplified flow chart of a method of measuring an optical spectrum according to an embodiment of the present invention.

FIG. 3A is a simplified flow chart of a method of measuring an optical signal with an optical spectrometer 60 according to an embodiment of the present invention. The optical spectrometer is calibrated (step 62) by providing a series of calibration signals (step 64). The separation between calibration signals is less than the nominal resolution of the LVF-detector array. For example, the filter-array assembly might have a nominal resolution of 8 Angstroms with a detector array of 256 pixels. In another embodiment, the nominal resolution is 3 Angstroms with a detector array of either 256 or 512 pixels.

In a particular embodiment, the calibration signals were spaced every 0.5 Angstroms. The LFV has an etalon structure with a tapered spacer region, and can be a bandpass or band-edge filter. The operating range or band of the LVF generally falls within 1530–1600 nm in order to measure or monitor current optical transmission networks, but other bands may be desirable for other applications, including other optical transmission systems. The LVF might have an operating band that is only a small portion of the 1530–1600 nm band, or cover the entire band.

The output of each detector is measured at each calibration wavelength (step 66). In a further embodiment, each detector is measured, but only detectors providing a value above a threshold value are stored, with a default value used in the reconstruction transfer function. In an alternative embodiment, only the detectors with a response significantly above the dark response are measured. The calibration values are stored in a calibration array (step 68). The term calibration "array" is used for purposes of discussion only as the common descriptive term, and does not limit how the calibration data might actually be structured or stored.

After calibration, an optical input signal is provided to the spectrometer (step 70) and measured (step 72) by reading the output from each of the n detectors. Again, in alternative embodiments some detectors might be "skipped", particularly if only a portion of the operating band of the spectrometer is of interest or if the detectors' response is not significantly above the dark response. The calibration array is then used in an inverse transfer process to reconstruct the optical input signal (step 74). The effective resolution of the reconstructed optical input signal is improved beyond the nominal resolution of the analyzer without the inverse transfer reconstruction. For example, the nominal resolution of the analyzer might be about 8 Angstroms, while the effective resolution after reconstruction is 1.6 Angstroms or less.

Using inverse transfer reconstruction allows measuring and monitoring of closely-spaced WDM signals carried on an optical network. The channel-to-channel spacing of the WDM signals might be 200 GHz in one embodiment, 100 GHz in another embodiment, 50 GHz in yet another embodiment, and less than 50 GHz in yet another embodiment. The enhanced resolution achieved by the combination of the stable, continuous LVF, the filter response (passband or edge-transition shape, namely the steep, sharp transitions) attainable with the etalon structure, and the inverse transfer reconstruction allows measuring and monitoring of such closely-spaced optical signals. For example, channel drift of several adjacent channels could be monitored to warn of potential interference.

Figure 3B:
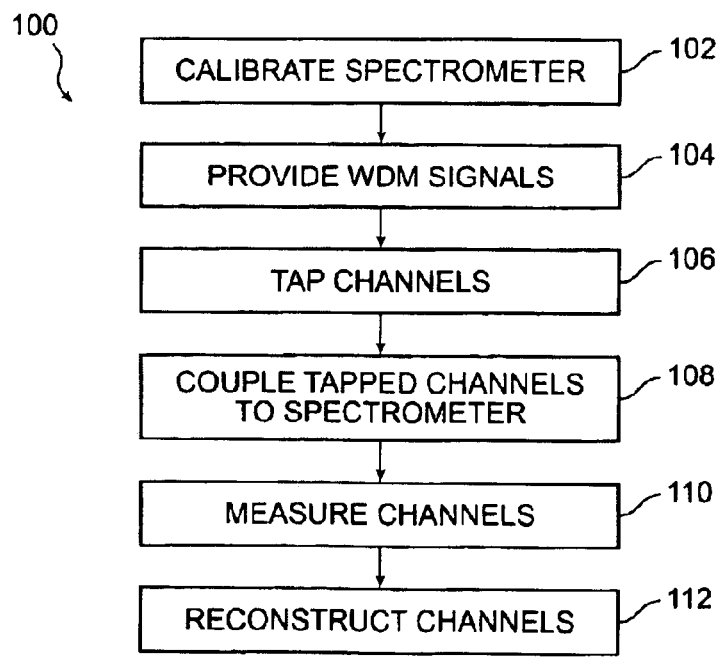
FIG. 3B is a simplified flow chart of a method of monitoring an optical network according to another embodiment of the present invention.

FIG. 3B is a simplified flow chart of a method of monitoring an optical network 100 according to another embodiment of the present invention. An optical spectrometer having an optical detector with n detectors and a nominal resolution of X nm is calibrated at at least 3n calibration wavelengths (step 102) to create a calibration array, as described above in reference to FIG. 3A. The optical network could be an optical telecommunication network, for example. In one application, the effective resolution of the spectrometer is sufficient to distinguish between and monitor adjacent channels having a channel spacing of 200 GHz, 100 GHz, or 50 GHz, for example. The operating band of the filter is chosen in accordance with the number of pixels in the detector array to achieve the desired resolution in some embodiments. For example, a detector array with more than 256 pixels is desirable when resolving channels spaced at 50 GHz over the entire 1530–1600 nm band.

A number of WDW signals are provided on an optical transmission line (step 104) and a portion of some or all of the WDM channels are tapped off (step 106) and coupled to the optical spectrometer (step 108). The optical spectrometer measures the in-band optical signals (step 110), and reconstructs the measured optical signals using a transfer function technique (step 112). In one embodiment, the effective resolution of the reconstructed signals was about X/3 nm, in another embodiment, the effective resolution of the reconstructed signals was about X/5 nm.

While the preferred embodiments of the present invention have been illustrated in detail, it should be apparent that modifications, adaptations, and equivalents to the described embodiments might occur to one skilled in the art without departing from the scope of the present invention as set forth in the following claims.

What is claimed is:

1. An optical spectrometer component comprising:
   a fiber optic input;
   a magnifying lens disposed to expand an optical signal from the fiber optic input to
   a collimating lens, the collimating lens disposed to provide a light beam to
   a variable bandpass filter having
   an etalon structure with
   a tapered spacer region being tapered along a taper direction, the variable bandpass filter having a thermal stability of less than or equal to 50 parts per million per degree Centigrade of ambient temperature change; and
   a linear optical detector array disposed along the taper direction.

2. The optical spectrometer of claim 1 wherein the variable bandpass filter has
   a first reflector comprising a first plurality of high-index layers and a first plurality of $SiO_2$ layers, the first plurality of high-index layers alternating with the first plurality of SiO$_2$ layers; and a second reflector comprising a second plurality of high-index layers and a second plurality of SiO$_2$ layers, the second plurality of high-index layers alternating with the second plurality of SiO$_2$ layers wherein the tapered spacer region comprises SiO$_2$.

3. The optical spectrometer of claim 2 wherein at least some layers of the first plurality of high-index layers comprise Ta$_2$O$_5$.

4. The optical spectrometer of claim 2 wherein at least some layers of the first plurality of high-index layers comprise Nb$_2$O$_5$.

5. The optical spectrometer of claim 1 wherein the variable filter has a thermal stability of lees than 25 parts per million per degree Centigrade of ambient temperature change.

6. The optical spectrometer of claim 1 wherein the variable filter has a thermal stability of less than 10 parts per million per degree Centigrade of ambient temperature change.

7. The optical spectrometer of claim 1 wherein the optical detector array has a length along the taper direction of less than or equal to 12 mm.

8. The optical spectrometer of claim 1 wherein the variable bandpass filter has a 50% bandwidth of less than or equal to about 0.6 nm at a center wavelength, the center wavelength being between about 1530–1600 nm.

9. The optical spectrometer component of claim 1 wherein the variable bandpass filter is a linear variable bandpass filter.

10. An optical spectrometer component comprising:

a fiber optic input;

magnifying lens disposed to expand an optical signal from the fiber optic input to a collimating lens, the collimating lens disposed to provide a light beam to a variable bandpass filter having an etalon structure with a tapered spacer region being tapered along a taper direction, the variable filter having a thermal stability of less than or equal to 50 parts per million per degree Centigrade of ambient temperature change and a 50% bandwidth of less than or equal to about 0.6 nm at a center wavelength, the center wavelength being between about 1530–1600 nm; and a linear optical detector array disposed along the taper direction, the linear optical detector array having a length of less than or equal to 12 nm along the taper direction.

11. The optical spectrometer component of claim 10 wherein the linear optical detector array has at least 256 pixels.

12. The optical spectrometer component of claim 10 wherein the linear optical detector array has at least about 512 pixels so as to provide a nominal resolution of the optical spectrometer component of about 3 Angstroms or less.

13. The optical spectrometer component of claim 10 wherein the variable bandpass filter is a linear variable bandpass filter.

14. An optical transmission network comprising:

an input optical fiber configured to carry a plurality of wavelength-division-multiplexed optical signals having nominal channel spacing of about 200 GHz or less;

an output optical fiber;

an optical tap disposed between the input optical fiber and the output optical fiber and configured to couple a portion of at least some of the plurality of wavelength-division-multiplexed optical signals to an optical spectrometer component having a variable filter including an etalon structure with at least one tapered spacer region being tapered along a taper direction with a thermal stability of less than 50 parts per million per degree Centigrade of ambient temperature change, and a detector array having n detectors affixed to the variable filter providing a nominal resolution; and an analyzer coupled to the optical spectrometer component so as to monitor each of the some of the plurality of optical signals and having a memory with a calibration array for m calibration wavelengths wherein m is greater than n to provide a spectrometer resolution that is greater than the nominal resolution.

15. The optical transmission network of claim 14 wherein the variable filter is a linear variable filter.

16. An optical spectrometer comprising:

a fiber optic input;

collimating optics;

a continuous linear variable filter having a tapered spacer region being tapered along a taper direction and having a thermal stability of less than 50 parts per million per degree Centigrade of ambient temperature change;

a linear optical detector array having n detectors disposed along the taper direction and providing a nominal resolution;

an analyzer electrically coupled to the linear optical detector array including a memory storing a calibration array for m calibration wavelengths wherein m is greater than n to provide a spectrometer resolution that is greater than the nominal resolution and wherein the collimating optics are disposed between the fiber optic input and the linear variable filter to illuminate the liner variable filter with a collimated light beam.

17. The optical spectrometer of claim 16 wherein the linear variable filter is a linear variable edge filter.

18. An optical transmission network comprising:

an input optical fiber configured to carry a plurality of wavelength-division-multiplexed optical signals having nominal channel spacing of about 200 GHz or less;

an output optical fiber;

an optical tap disposed between the input optical fiber and the output optical fiber and configured to couple a portion of at least some of the plurality of wavelength-division-multiplexed optical signals to an optical spectrometer having a nominal resolution less than or equal to 8 Angstroms and a thermal stability of less than 50 parts per million per degree Centigrade of ambient temperature change and including a variable filter with at least one tapered spacer region being tapered along a taper direction, and a detector array affixed to the variable filter; each an analyzer coupled to the optical spectrometer component so as to monitor each of the some of the plurality of optical signals.

19. The optical transmission network of claim 18 wherein the optical spectrometer further comprises an analog-to-digital converter to provide digital electronic signals to the analyzer.

20. The optical transmission network of claim 18 wherein the variable filter is a linear variable filter.

* * * * *